Feb. 3, 1959 J. V. S. DAHLGREN 2,872,535
CIRCUIT REGULATING AND CONTROL MECHANISM
Filed May 11, 1956 2 Sheets-Sheet 1

INVENTOR
John V. S. Dahlgren
BY
Pennie, Edmonds, Morton, Barrows & Taylor
ATTORNEYS Feb. 3, 1959
J. V. S. DAHLGREN
2,872,535
CIRCUIT REGULATING AND CONTROL MECHANISM
Filed May 11, 1956
2 Sheets-Sheet 2
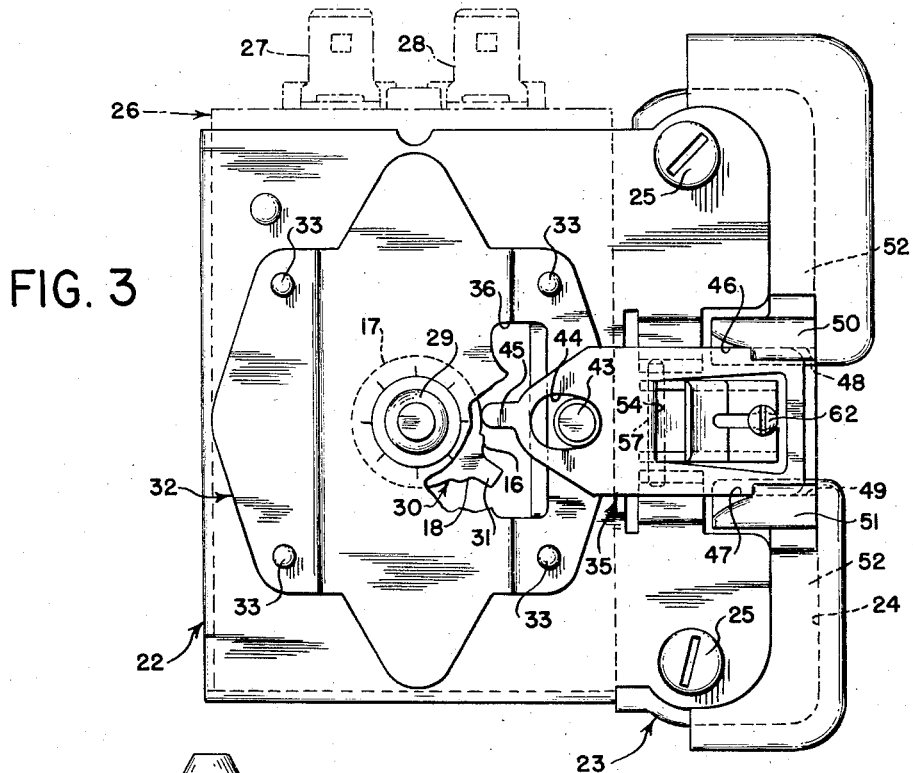
INVENTOR
John V.S. Dahlgren
BY
*Pennie, Edmonds, Morton, Barrows & Taylor*
ATTORNEYS

United States Patent Office 2,872,535
Patented Feb. 3, 1959

2,872,535

CIRCUIT REGULATING AND CONTROL MECHANISM

John V. S. Dahlgren, Fairhaven, N. J., assignor to The Wilcolator Company, Elizabeth, N. J., a corporation of Delaware Application May 11, 1956, Serial No. 584,311

6 Claims. (Cl. 200—6)

This invention relates to apparatus for the control of electrical circuits and particularly to apparatus for the regulation of an environment-responsive circuit control and the simultaneous and coordinated selection of circuits for the control by means of a single adjustable actuator.

There are innumerable types of apparatus having two or more electrically energized components, the operation of any one, some, or all of which is to be controlled in accordance with an environmental condition such as temperature, pressure, humidity, electrical current, etc. Moreover, it is frequently desirable to operate the several components of the apparatus simultaneously while at other times it is desirable to operate only one or some of the components. Of course, there must be means for turning the entire apparatus off. Ordinarily, each mode of regulation and control of each electrical component requires a separate controlling device actuated by a separate knob or lever. The more control devices required to operate the components of the apparatus in their various combinations and to regulate the environmental response of some or all of them, the more knobs and levers there are for the operator of the apparatus to deal with. Obviously, coordinated operation of the several components becomes a matter requiring some understanding and skill on the part of the operator.

My present invention provides apparatus by which are combined, under the control of a single movable element such as a dial, the regulation of a circuit controlling means and the selection of circuits to be controlled by that means. The new apparatus permits simultaneous or alternative operation of two or more electrical components, and also provides means for interrupting all the regulated and controlled circuits by means of the single control element.

According to my invention, this new apparatus for simultaneous regulation of, and selection of circuits for, an environment-responsive circuit controlling means comprises a control element adapted to regulate environment-responsive circuit controlling means of any type having an intermittently or continuously variable range. The apparatus is provided with at least two switch contact points and a movable contact arm adapted to engage the contact points singly. A variable dimension linkage, the actuation of which is coordinated with the motion of the control element, is utilized to shift the engagement of the contact arm from one contact point to another or to shift the arm out of engagement with the contact points in accordance with the position of the control element. Appropriate circuit connections are made between the environment-responsive controlling means and the contact points so that external electrical components may be provided with the desired regulated and controlled circuits.

An outstanding feature of my invention is the provision of means for combining a plurality of diverse regulating and controlling functions into the motion of a single element, such as a dial or lever. By these means the operation of two or more electrical components may be properly coordinated to insure optimum operation of the apparatus of which the components are part. Moreover, my new control apparatus greatly simplifies the operation of electrical devices having a number of different, but functionally distinct, related, electrical components which would normally require a plurality of different controls. This feature is particularly desirable where the electrical apparatus is primarily intended for use in households and other places where the operators cannot be expected to have any technical understanding or skill and must rely on simple instructions. Additionally, the unified and coordinated control and regulation of the several components which is afforded by my new apparatus provides means for insuring the electrical apparatus against damage due to improper setting of separate controls.

In the following specification, I give a detailed description of paritcular embodiments of my invention which are especially well adapted to the applications set forth. In the course of the description, reference is had to the accompanying drawings in which Fig. 1 is a schematic illustration of electrical apparatus having two components which are to be operated alternatively and in accordance with a controlled temperature;

Fig. 3 is a plan view of regulation and control apparatus of my invention for use in the applications of Fig. 1 or Fig. 2;

Fig. 4 is a side elevation, partly in section, of the control apparatus of Fig. 3;

Fig. 7 is a perspective view of a bell-crank which is used in the apparatus of Figs. 3, 4, and 5.

Figures 1, 6:
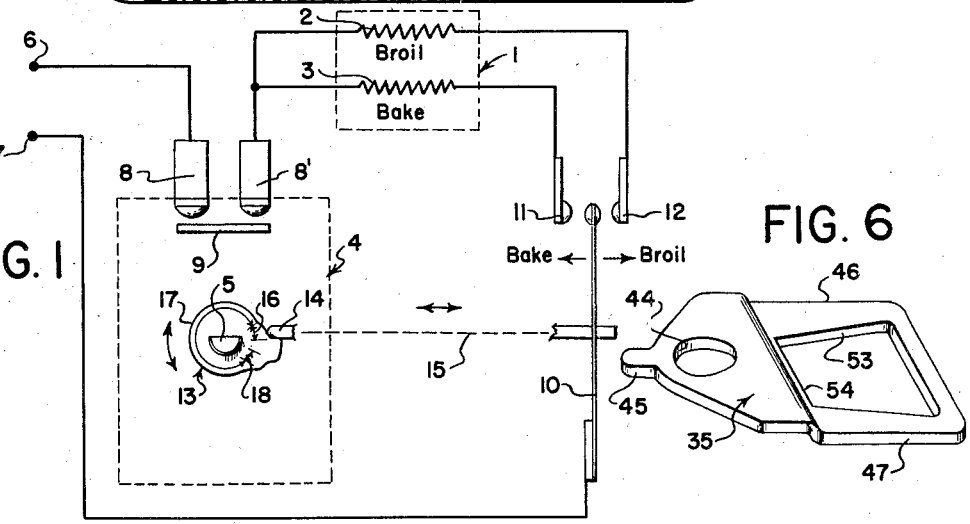
Fig. 6 is a perspective view of a cam follower link which is used in the apparatus of Figs. 3, 4, and 5.

To assist the reader to a full understanding of my invention, I will describe two specific applications of my invention. Referring first to Fig. 1, I have illustrated at 1 an electric oven provided with a "broil" heating element 2 and a "bake" heating element 3. Both of these elements may be resistance coils which are well known in the art. Generally, in the operation of an electric oven of this type, the "broil" element is operated continuously at its safe maximum rated output. On the other hand, the "bake" elements is operated so that any oven temperature within a predetermined range may be maintained continuously. This requires that the heating element be turned on intermittently to supply heat for making up heat losses through the walls of the oven. A continuously or intermittently variable thermostatic control 4 of some type is provided to maintain the oven at the desired temperature. The regulation of the variable thermostatic control is by a rotatable shaft 5.

A source of electric power is connected at the terminals 6 and 7 and the terminal 6 is, in turn, connected to the switch in the thermostatic control comprising an input contact point 8, an output contact point 8′ and a contact strip 9 moved into and out of engagement with the contact points by the thermally responsive mechanism of the thermostat.

The other source terminal 7 is connected to a movable or flexible contact arm 10 of a circuit selecting switch. The switch is also provided with a pair of spaced contact points 11 and 12. One end of each of the heating elements 2 and 3 is connected to the output point 8′ of the thermostatic switch 4 while the other end of the "broil" element is connected to the switch point 12 of the circuit selector switch and the other end of the "bake" element 3 is connected to the switch point 11.

Now, it is desired to be able to turn both heating elements 2 and 3 off entirely by means of the control shaft 5; second, the "bake" element should have an energizing circuit which is under the control of the variable thermostatic switch 4 throughout its entire range; and, third, the "broil" element should have a circuit which is complete when the control shaft is turned to a particular position, preferably that corresponding to the maximum temperature setting of the thermostat or beyond.

According to my invention, I accomplish these three results by providing a cam surface 13 associated with or driven by the shaft 5. A cam follower 14, arranged to engage the various throws of the cam surface, is displaced by the different throws of the cam surface and transmits these displacements through a linkage, indicated schematically at 15, to the movable or flexible contact arm 10 to position the arm in engagement with one or the other of the contacts 11 or 12 or out of engagement with either of them.

The cam surface 13 in Fig. 1 is provided with a throw 16 which has an amplitude sufficient to move the contact arm 10 out of engagement with either the switch point 11 or the switch point 12. I shall term this the "off" throw. The cam surface also has a throw 17 of substantially constant amplitude. Its angular extent is such that the control shaft 5 may be turned through the full adjustment range of the thermostatic control while the cam follower 14 rides on the constant, or "brake," throw, the amplitude of which is such that the cam follower 14, acting through the linkage 15, actuates the contact arm 10 into engagement with the switch point 11. There is also a "broil" throw 18 having a rise which is greater than the rise of the throw 16 and is sufficient to cause the cam follower 14 to position the contact arm 10 in engagement with the switch point 12. Thus, clockwise rotation of a single control, the control shaft 5, selects the circuit for the "bake" element and completes the circuit by urging the movable contact strip 9 across the contact points 8 and 8' of the thermostatic control. Further rotation of the shaft to any position within the angular limits of the constant throw of the cam serves to set the thermostatic control to maintain the desired baking temperature. If the control shaft is rotated sufficiently far so that the follower engages the "broil" throw 18 of the cam the circuit for the "broil" element 2 is selected. Although the circuit still includes the strip 9 and the contact points 8 and 8' of the thermostatic control, the control is no longer operative in the sense that it will intermittently interrupt the circuit to maintain a preselected maximum temperature as it does when the control is set at some position within the "bake" range. On the other hand, most thermostatic controls are constructed so that if they are set to the upper limit of the controllable temperature range and the oven temperature then exceeds a safe operating temperature, the thermostatic control will open the heating circuit to prevent damage to the oven and the control.

Figure 2:
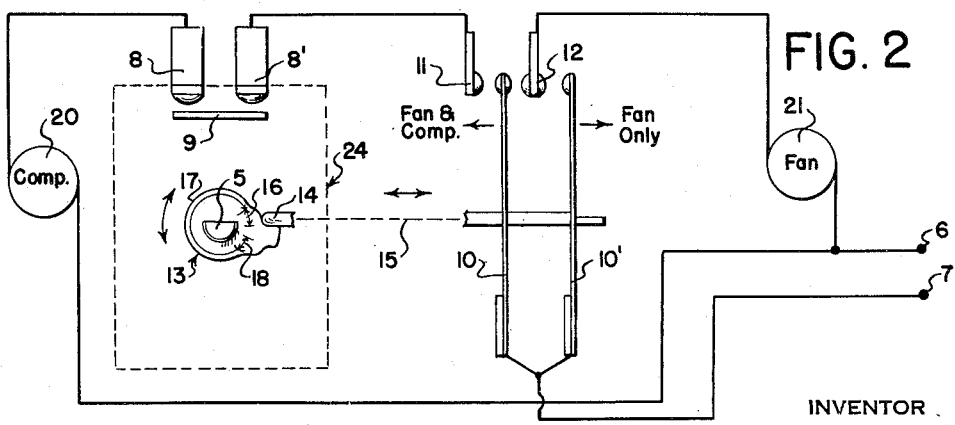
Fig. 2 is a schematic diagram of electrical apparatus having two components which are to be operated simultaneously or alternatively and which are to be regulated according to ambient temperature when simultaneously operated.

In Fig. 2 I have illustrated an application of my invention in which the controlled apparatus comprises two electrical components, a compressor motor 20 and a fan motor 21, which are to be operated simultaneously under some conditions and, under other conditions, only the fan motor is to be operated. Moreover, when the fan and compressor are being operated simultaneously the compressor is to be under the control of the thermostatic switch 4. In this embodiment the thermostatic switch has the same elements as in Fig. 1, including the three-throw cam surface 13, the cam follower 14, and the linkage 15. However, in this embodiment I have provided a second selector switch contact arm 10' adapted to engage the contact point 12. Both contact arms 10 and 10' are connected to the source terminal 7 while the source terminal 6 is connected to one terminal of the compressor motor 20 and to one terminal of the fan motor 21. The other terminal of the compressor motor is connected to the thermostatic control input point 8 and the other terminal of the fan motor 21 is connected to the selector switch point 12. There is also a connection between the thermostatic control output point 8' and the selector switch point 11.

The operation of the embodiment of Fig. 2 is as follows. With the thermostatic control shaft 5 turned to its full counter-clockwise position as illustrated, the cam follower 14 engages the cam throw 16 which is proportioned to actuate the contact arms 10 and 10' to positions in which they are out of engagement with the contact points 11 and 12. This is the "off" position of the control shaft. As the control shaft 5 is turned clockwise so that the cam follower 14 engages the constant throw 17 of the cam surface 13, the contact arms 10 and 10' are actuated into engagement with the selector switch contact points 11 and 12, respectively. A circuit is selected for the compressor motor which begins at the source terminal 7 and continues through the contact arm 10, the switch point 11, the contact points 8 and 8' of the thermostat, the compressor motor 20, and back to the source terminal 6. Another circuit is simultaneously established for the fan motor; it begins at the source terminal 7 and continues through the contact arm 10', the switch point 12, the fan motor 21 and back to the source terminal 6. These two circuits are maintained whatever the position of the thermostatic control shaft 5 within the range of the constant throw 17 of the cam surface.

Whenever it is desired to operate the fan independently of the compressor, the control shaft 5 is rotated to its full clockwise position so that the cam follower 14 engages the cam throw 18. The latter is of sufficient amplitude to position the contact arm 10 in engagement with the contact point 12 and to move the contact arm 10' out of engagement with the contact point 12. This establishes a circuit for the fan motor 21 from the source terminal 7 through the contact arm 10, the switch point 12, the fan motor 21 and back to the source terminal 6. The thermostatically controlled circuit for the compressor is broken at the switch point 11.

Figure 5:
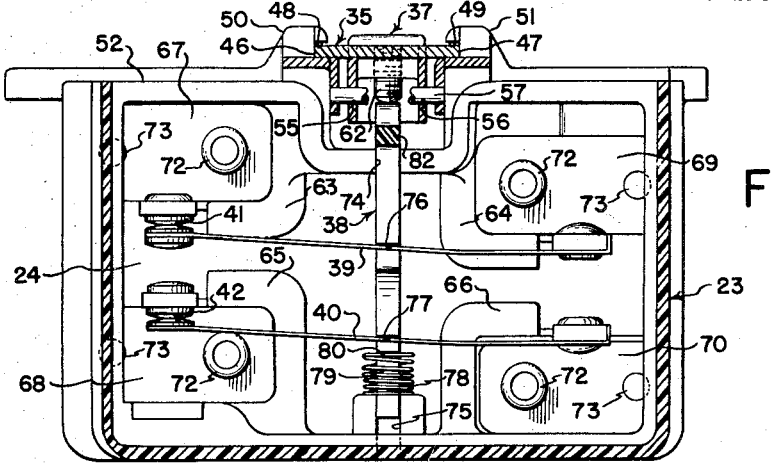
Fig. 5 is a section of the control apparatus of Fig. 4 taken along the line 5—5.

In Figs. 3, 4, and 5 I have illustrated one compact and integrated embodiment of the control apparatus of my invention which is specifically adapted for the application discussed in connection with Fig. 2, but may be used with or without obvious modifications in the application discussed in connection with Fig. 1. In the plan view of Fig. 3 and the side elevation of Fig. 4 there is shown a frame 22 and a box-like housing 23 having a rear wall 24, said frame and said housing sometimes hereinafter being referred to collectively as a housing for the entire circuit control mechanism. The frame 22 may be of metal but the selector switch housing is made of an electrical insulating material inasmuch as electrical tie plates are riveted thereto as will appear in the following description. The frame and the housing are fixed together at right angles by bolts 25.

A thermostatic switch 26 is fastened to the underside of the frame 22. In practice the thermostatic control may be of any desired type as for example that described and claimed in my co-pending application, entitled "Electric Switch Mechanism," Serial No. 571,634, filed March 15, 1956. The terminals for the electric contact points 8 and 8' shown in Figs. 1 and 2 are illustrated at 27 and 28 in Fig. 3.

A control element in the form of a rotatable shaft 29 is journaled in the frame 22. A suitable control knob may be fixed to the upper end of this shaft and the lower end is adapted to regulate by its rotation the thermostatic switch 26. A cam 30 is fixed to the shaft 29 to rotate therewith. This cam has the three throws 16, 17, and 18 described in connection with the cam surface 13 of Figs. 1 and 2 and is provided with a radially extending stop lobe 31, the opposite edges of which provide interference with the cam follower 35 (described below) to define the extremes of rotation of the control shaft 29. Utilizing the reference numerals of Figs. 1 and 2, the cam 30 is provided with a peripheral cam surface 13 having an "off" throw 16 of a particular radial amplitude, a throw 17 preferably having constant amplitude and extending around a substantial portion of the periphery of the cam, and a throw 18 on the side of the stop lobe 31 opposite the throw 16. In this particular embodiment the constant amplitude throw 17 is of the least radial amplitude while the "off" throw 16 is of slightly greater amplitude than the throw 17 and the throw 18 is of greater amplitude than the throw 16. The cam is precisely positioned longitudinally of the shaft 29 by a U-shaped bracket 32 which is bolted or riveted to the upper surface of the frame 22. A leaf spring 34 bears against the underside of the cam to keep it in contact with the underside of the bracket 32.

The cam 30 is the first of a train of elements in a variable length linkage which also includes a cam follower element 35 extending through an aperture 36 in the bracket to engage the cam, a bell-crank element 37 and a contact arm actuator element 38. The latter element engages the contact arms 39 and 40, as best seen in Fig. 5, to selectively position them into or out of engagement with contact points 41 and 42.

The cam follower element 35, shown separately in Fig. 6, has a rounded cam follower lobe 45 extending from its tapered end. It is also provided with a slot 44 having rounded ends and straight sides which converge in the direction away from the lobe 45. The rectangular end of the follower element has a crank-receiving aperture 53, the forward edge 54 of which is a thrust lip used to transmit force between the follower element and the crank element.

This follower element 35 is mounted for reciprocating motion on a stud 43 which is fixed to the frame 22 and extends into the tapered slot 44 in the follower element.

The mounting means for the follower element also includes the opposite longitudinal edges 46 and 47 which slide in the guide channels 48 and 49 of the guide blocks 50 and 51. These blocks are fixed to the upper side wall 52 of the housing 23. The channels and the stud cooperate to guide the follower element 35 and maintain the follower lobe 45 in alignment with the cam surface. It will be understood that converging sides of the slot 44 facilitate the sliding of the follower element on the stud 43 inasmuch as the thrusts exerted on the follower 45 by the transition surfaces between adjacent throws of the cam are not longitudinal of the cam surface follower but are somewhat askew.

The crank element 37 of this embodiment, shown separately in Fig. 7, is an essentially channel-shaped member having a pair of axially aligned holes 55 and 56 drilled through the opposite walls of the channel. The crank element is pivotally mounted on a pin 57 passing through these holes and fixed at its opposite ends in internal structural members of the housing 23. On the opposite walls of the channel shaped crank element there are thrust shoulders 58 and 59 which cooperate with the thrust lip 54 of the follower element and the body of the crank element is drilled and threaded as at 61 to receive an adjusting screw 62. The lower end of this screw bears on the upper end of the contact arm actuator element 38.

Referring now to Fig. 5 the internal arrangement of the housing 23 includes structural stiffening members which are preferably formed integrally with the housing and are also arranged to positively position conductive members which carry the contact arms and contact points of the selective switch mechanism. These stiffening members are indicated at 63, 64, 65, and 66. It will be seen in Fig. 5 that they are basically L-shaped and extend normally from the back wall 24 of the housing. The two legs of each stiffening member combine with the adjacent intersecting walls of the housing to form substantially isolated rectangular areas in which the conductive tie plates 67, 68, 69, and 70 are placed flat against the back wall 24 of the housing. The tie plates 67 and 68 have attached thereto the lugs which carry the contact points 41 and 42, respectively and the tie plates 69 and 70 have lugs which carry the fixed ends of the contact arms 39 and 40, respectively. Each of the tie plates is secured to the back wall of the housing by means of a rivet 72. External connections to the tie plates are made by terminal screws 73 which pass from the outside of the housing through the wall 24 and are threaded into the tie plates. The terminal screws 73 seen in Fig. 4 are for the tie plates 68 and 69 shown in Fig. 5. As seen in the latter figure, the flexible contact arms 39 and 40 extend across the interior of the housing 23. They are actuated by the actuator element 38 which is slidably mounted in an upper guide slot 74 and a lower guide slot 75 formed in the internal structural members of the housing. As seen in Fig. 5, these slots are in vertical alignment with the adjusting screw 62 of the bell crank 37.

An upper notch 76 is positioned in the actuator element to receive the contact arm 39 and a lower notch 77 receives the contact arm 40. The inherent springiness of these contact arms urges them upward so that the upper contact arm engages the contact point 41 while the lower contact arm engages the contact point 42 when the position of the actuator element 38 permits. A compression spring 78 encircles a spring guide 79 at the lower end of the actuator element. The upper end of the spring bears against a shoulder 80 on the element 38 and the lower end of the spring rests on the housing structural members defining the slot 75. The effect of this spring is to constantly force the actuator and this force is in turn transmitted through the bell crank and the follower element so that the follower lobe 45 is always in firm engagement with the cam 30. The combination of elements including the cam 30 forms, in effect, a variable dimensional linkage, the length of which is everywhere dependent on the angular setting of the control shaft 29.

A cover plate 81 serves to close the open side of the housing to protect the elements of the selecting switch mechanism. A rounded portion 82 of the actuator element 38 bears against the inner surface of the cover plate 81 to hold the actuator in place in its guide-slots 74 and 75. Thus, the actuator is constrained in all directions and may only reciprocate within the limited range permitted by the motion of the crank element at its upper end and by the spring 78 at its lower end.

The connection and operation of the apparatus in a circuit like that described in connection with Fig. 2 is readily apparent. Inasmuch as all circuit connections are made to the external terminals 27 and 28 and terminal screws 73 the control apparatus may be readily adapted for use in different circuits such as the oven circuit of Fig. 1. In the latter case a connection from the source terminal 7 to the screw terminal 73 on the tie plate 69 would be made. Then the contact arm 39 would correspond to the contact arm 10 in Fig. 1. Connections would be made from the screw terminals on the tie plates 67 and 68 to the terminals of the "bake" and "broil" heating elements of the oven and the heating elements would also be connected to the thermostat terminal 28. Finally, a connection would be made from the thermostat terminal 27 to the source terminal 6. In a modified connection of this type the contact arm 40 would be superfluous. Of course, if my invention were to be embodied in control apparatus especially intended for use in a circuit like that of Fig. 1 the contact arm 40 and its tie plate 70 would be omitted entirely.

Other embodiments of my invention having more contact arms and cooperating contact points can be easily devised in view of the foregoing disclosure. Cam surfaces having a different combination of throws may be employed where the particular application requires a different scheme of coordination between the selection of circuits and the insertion of the environment-responsive switch in one or more of the circuits. These are merely examples of possible modifications of my invention and are given solely for purposes of illustration. The scope of the invention is defined by the following claims.

I claim:

1. Apparatus for remotely actuating a movable switch contact arm of an electrical switch having a plurality of spaced switch points to be contacted by the arm, which apparatus comprises a switch housing and a frame fixed to one wall of said housing, a rotatable control shaft journaled in said frame, a cam fixed to said shaft for rotation therewith, and provided with a throw of different amplitude for each position of the contact arm, a cam follower slidably mounted on said housing adjacent said cam, a bell crank pivotally mounted on a wall of said housing and having one leg thereof in engagement with said follower and the other leg extending into said housing, and a contact arm actuator mounted within said housing to be reciprocably driven by the other leg of said crank, whereby rotation of said shaft causes said arm actuator to be displaced in accordance with the amplitudes of the cam throws engaged by the follower.

2. A multicircuit selector switch comprising a housing, a plurality of contact arms and cooperating switch points mounted in said housing, each of said contact arms being constructed and arranged to be movable into contact with different ones of said switch points, a rotatable control shaft journaled in said housing, a cam fixed to said shaft for rotation therewith and provided with at least two throws of different amplitudes at angularly spaced positions about the axis of said shaft, a cam follower slidably mounted on said housing adjacent said cam, a bell crank pivotally mounted on a wall of said housing and having one leg thereof in engagement with said follower and the other leg extending into said housing, and a contact arm actuator mounted within said housing to be reciprocably driven by the other leg of said crank, and the amplitudes of said throws being such that each arm engages a switch point when the follower engages one of said throws, one arm engages a switch point when the follower engages a second of said throws and neither arm engages a switch point when the follower engages a third of said throws.

3. A multicircuit selector switch according to claim 2 in which the cam follower comprises a body portion and a lobe extending therefrom and having a rounded cam contacting portion, said follower having an elongated aperture therein adjacent the lobe, said aperture having its long axis substantially parallel to the direction of normal thrust exerted on the lobe by said surface and having its long sides oblique to its axis such that the aperture is wider at its end adjacent the lobe than at its end remote from the lobe, a cam follower guiding stud fixed to said housing and extending through the follower aperture, the cross section of said stud being of substantially the same width as said aperture at the end remote from the lobe, and means for guiding said follower at a position remote from said lobe.

4. Apparatus according to claim 1 in which the cam follower comprises a body portion one end of which has a rounded cam contacting portion, said follower having an elongated aperture therein adjacent the end having said rounded portion, said aperture having its long axis substantially parallel to the direction of normal thrust exerted on the cam follower by the cam and having its long sides oblique to its axis such that the aperture is wider at its end adjacent the end of the cam follower having the rounded portion than at its end remote therefrom, a cam follower guiding stud fixed to the housing and extending through said aperture, the cross section of the stud being of substantially the same width as the aperture at its said remote end.

5. Apparatus according to claim 1 which includes adjustable means carried by said other leg of said bell crank and adapted to drivingly engage said contact arm actuator whereby the interconnection between said other leg of said bell crank and said contact arm actuator is adjustable.

6. Apparatus for remotely actuating a movable switch contact arm of an electric switch in which said contact arm has a plurality of spaced switch positions, which apparatus comprises a switch housing and a frame fixed to one wall of said housing, a rotatable control shaft journaled in said frame, a cam fixed to said shaft for rotation therewith, and provided with a throw of different amplitude for each position of the contact arm, a cam follower slidably mounted on said housing adjacent said cam, a bell crank pivotally mounted on a wall of said housing and having one leg thereof in engagement with said follower and the other leg extending into said housing, and a contact arm actuator mounted within said housing to be reciprocably driven by the other leg of said crank, whereby rotation of said shaft causes said arm actuator to be displaced in accordance with the amplitudes of the cam throws engaged by the follower.

References Cited in the file of this patent

UNITED STATES PATENTS

| | | |
|---|---|---|
| 2,409,434 | Jacobs | Oct. 15, 1946 |
| 2,583,661 | Morrison | Jan. 29, 1952 |